(12) United States Patent
Gum

(10) Patent No.: US 10,890,452 B2
(45) Date of Patent: Jan. 12, 2021

(54) METHOD AND APPARATUS FOR NAVIGATION BASED ON ROUTE REUSE

(71) Applicant: QUALCOMM Incorporated, San Diego, CA (US)

(72) Inventor: Arnold Jason Gum, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 589 days.

(21) Appl. No.: 15/793,732

(22) Filed: Oct. 25, 2017

(65) Prior Publication Data
US 2019/0120629 A1 Apr. 25, 2019

(51) Int. Cl.
| G01C 21/26 | (2006.01) |
| G01C 21/34 | (2006.01) |
| G01C 21/36 | (2006.01) |
| H04W 48/16 | (2009.01) |
| H04W 4/02 | (2018.01) |
| G01C 21/32 | (2006.01) |

(52) U.S. Cl.
CPC .......... *G01C 21/26* (2013.01); *G01C 21/32* (2013.01); *G01C 21/3461* (2013.01); *G01C 21/362* (2013.01); *G01C 21/3629* (2013.01); *G01C 21/3647* (2013.01); *G01C 21/3664* (2013.01); *H04W 4/02* (2013.01); *H04W 48/16* (2013.01)

(58) Field of Classification Search
None
See application file for complete search history.

(56) References Cited

U.S. PATENT DOCUMENTS

| 9,374,659 B1* | 6/2016 | Kahn | G01S 19/26 |
| 10,545,026 B1* | 1/2020 | Schaefer | G01C 21/206 |
| 2005/0272444 A1 | 12/2005 | Heffield et al. | |
| 2007/0010259 A1* | 1/2007 | Hoffmann | H04B 17/309 |
| | | | 455/456.1 |
| 2008/0132249 A1* | 6/2008 | Hamilton | H04W 4/029 |
| | | | 455/456.3 |
| 2009/0143079 A1* | 6/2009 | Klassen | H04W 4/027 |
| | | | 455/456.3 |
| 2010/0228478 A1 | 9/2010 | You | |
| 2010/0318293 A1* | 12/2010 | Brush | G01C 21/20 |
| | | | 701/431 |
| 2011/0029229 A1* | 2/2011 | Hui | G01C 21/20 |
| | | | 701/533 |
| 2012/0046862 A1* | 2/2012 | Griffin | G01C 21/20 |
| | | | 701/521 |

(Continued)

FOREIGN PATENT DOCUMENTS

EP 1251334 A2 10/2002

OTHER PUBLICATIONS

International Search Report and Written Opinion—PCT/US2018/053302—ISA/EPO—dated Apr. 18, 2019.

*Primary Examiner* — Nicholas K Wiltey

(57) ABSTRACT

A mobile device includes processor(s) coupled to memory, an input device, an output device, and a wireless transceiver. The mobile device can determine whether a destination is in a no wireless network coverage area. If so, then the route data used to provide navigation instructions to the destination is retained in the memory of the mobile device. In subsequent navigation, the mobile device can use the route data for navigation to a subsequent destination.

17 Claims, 11 Drawing Sheets

(56) References Cited

U.S. PATENT DOCUMENTS

| | | | |
|---|---|---|---|
| 2014/0088860 A1* | 3/2014 | Poornachandran | G01C 21/206 |
| | | | 701/410 |
| 2014/0335897 A1* | 11/2014 | Clem | G08G 1/147 |
| | | | 455/456.3 |
| 2017/0086022 A1* | 3/2017 | Beattie, Jr. | H04W 64/00 |
| 2017/0140478 A1* | 5/2017 | Freeman | G06Q 50/02 |
| 2018/0038938 A1* | 2/2018 | Fechine | B60Q 9/00 |
| 2018/0077536 A1* | 3/2018 | Lai | H04W 4/024 |
| 2018/0088746 A1* | 3/2018 | Cheung | G06F 3/147 |
| 2018/0088788 A1* | 3/2018 | Cheung | G06F 3/04855 |

* cited by examiner

METHOD AND APPARATUS FOR NAVIGATION BASED ON ROUTE REUSE

BACKGROUND

Field

This application relates to navigation using a mobile device, for example, a mobile telephone or smart phone or other device capable of providing navigation instructions to a destination.

Background

Mobile devices often include features such as the ability to receive navigation instructions to a destination via a navigation function or application. Directions can include audio, visual, textual, or a combination of these. A user can obtain directions via a navigation function or application which can connect to a server for receiving map and/or route data for providing the navigation instructions. Once the user reaches the destination, the mobile device typically erases the received map and/or route data. As a result, if the destination is in an area where there is no network connectivity, the mobile device cannot access a server to download map and/or route data for a subsequent navigation session.

SUMMARY

In one aspect, a method for providing navigation on a mobile device can include receiving, at the mobile device, a first destination. Using a user interface of the mobile device, the method can also include providing navigation instructions to the first destination based on first route data. The method also includes determining whether the first destination is within a no wireless network coverage area, and responsive to a determination that the first destination is within the no wireless network coverage area, retaining the first route data in a memory of the mobile device. Using the user interface, the method includes subsequently providing navigation instructions to a second destination based on the first route data retained in the memory of the mobile device. If the second destination is not along a route associated with the first route, providing navigation instructions to the second destination can include providing navigation instructions to a location within a wireless network coverage area. Responsive to a determination that the location within the wireless network coverage area is reached, the method can then include transmitting, to a server, a request for second route data to the second destination.

In another aspect, a mobile device comprises a wireless transceiver, a user interface, a memory, and one or more processors coupled to the memory, the user interface, and the wireless transceiver. The one or more processors and the memory can be configured to receive, via the user interface, a first destination; provide, via the user interface, navigation instructions to the first destination based on first route data; determine whether the first destination is within a no wireless network coverage area; retain the first route data in the memory of the mobile device responsive to a determination that the first destination is within the no wireless network coverage area; and provide, via the user interface, navigation instructions to a second destination based on the first route data retained in the memory of the mobile device.

In another aspect, an apparatus for providing navigation comprises means for receiving the first destination, means for providing navigation instructions to the first destination based on first route data, means for determining whether the first destination is within a no wireless network coverage area, and means for retaining the first route data responsive to a determination that the first destination is within the no wireless network coverage area. The apparatus further comprises means for providing navigation instructions to a second destination based on the first route data retained in the means for retaining the first route data.

In another aspect, a non-transitory computer readable medium can store instructions for execution by one or more processors of a mobile device to perform operations. The operations can comprise receiving the first destination, providing navigation instructions to the first destination based on first route data, determining whether the first destination is within a no wireless network coverage area, retaining the first route data in a memory of the mobile device responsive to a determination that the first destination is within the no wireless network coverage area, and providing navigation instructions to a second destination based on the first route data retained in the memory of the mobile device.

DETAILED DESCRIPTION

Figure 1A:
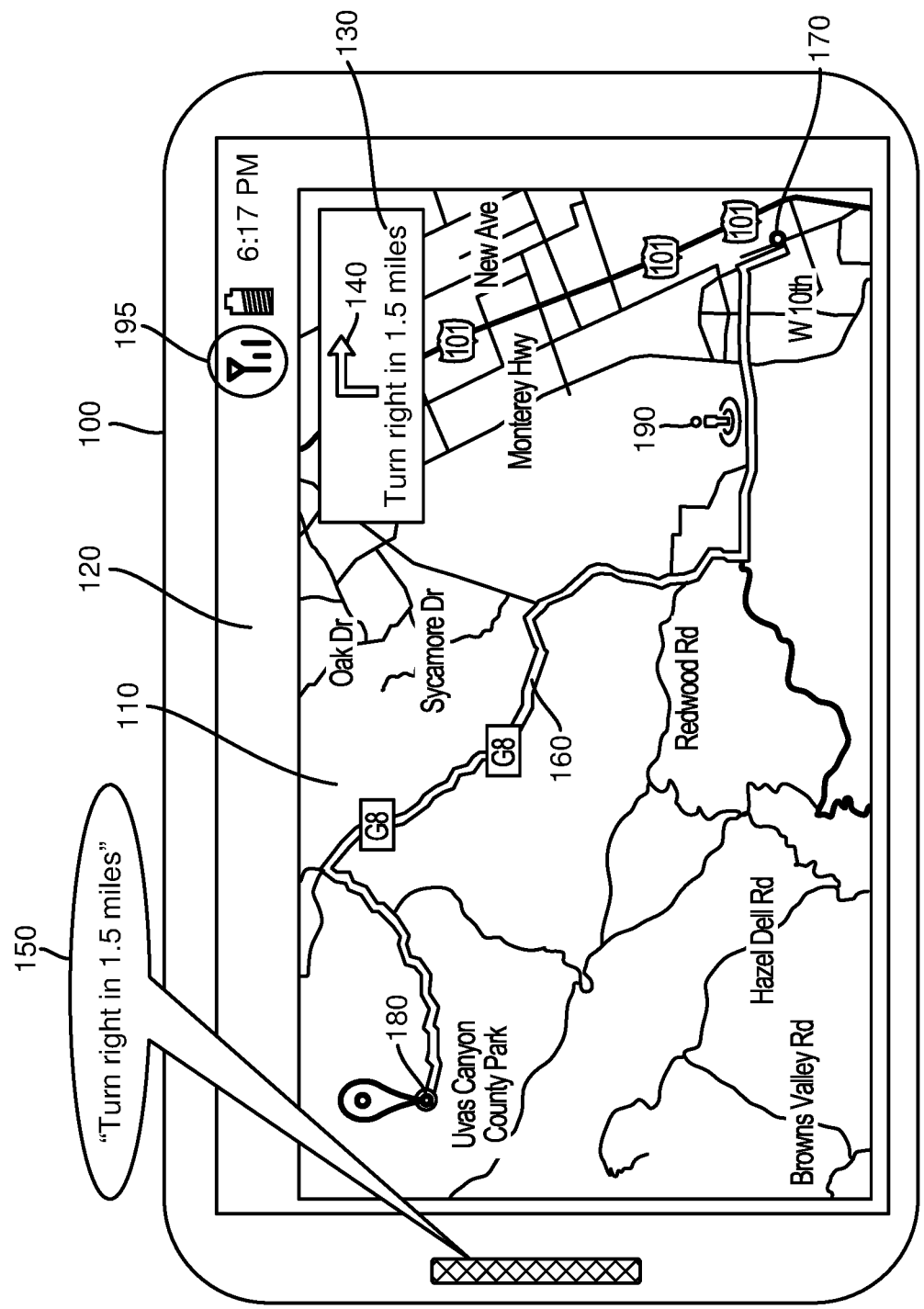
FIG. 1A illustrates an example image of a screen of a mobile device providing navigation to a user along a first route from a first starting point to a first destination, where the mobile device is located in a wireless network coverage area.

FIG. 1A illustrates an example image of a screen of a mobile device providing navigation to a user along a first route from a first starting point to a first destination, where the mobile device is located in a wireless network coverage area. As illustrated in FIG. 1A, the navigation being provided to the user by mobile device 100 can include map 110 displayed on a display of mobile device 100, as well as the text-based navigation instructions 130, image-based navigation instructions 140 (illustrated as an indication to turn right, without use of text), as well as audio-based navigation instructions 150. The navigation route 160 begins at a starting point 170 and ends at a destination 180, which can, for example, be a first destination. It is understood that when describing providing navigation or navigation instructions to a user, the mobile device or one or more processors within the mobile device, can provide navigation instructions to a user interface through which the user then receives the instructions. Hence, the user interface can include a graphical interface displayed on a screen or touchscreen of the mobile device. A user interface can include an output device such as a speaker through which the user receives audio-based navigation instructions 150. The map 110 includes an indication 190 of the present location of the mobile device. Furthermore, as shown by indication 190, the present location of the mobile device is an area where there is wireless network coverage by a, for example, wireless wide area network (WWAN). So long as the mobile device 100 remains within a wireless network coverage area, the mobile device can receive data, including map and route data from a map and/or route server to aid in navigation. In some implementations, the route server, the map server, or mobile device 100 may have access to data indicating that the navigation route 160 includes some areas with little to no wireless network coverage. In such scenarios, the mobile device 100 may then download all the data to be used for displaying map 110 and/or to provide navigation instructions (including text-based navigation instructions 130, image-based navigation instructions 140, and/or audio-based navigation instructions 150, which may collectively be referred to as (navigation instructions 130, 140, 150) at or near the starting point 170 to mitigate any lack of access by the mobile device to data along navigation route 160.

Figure 1B:
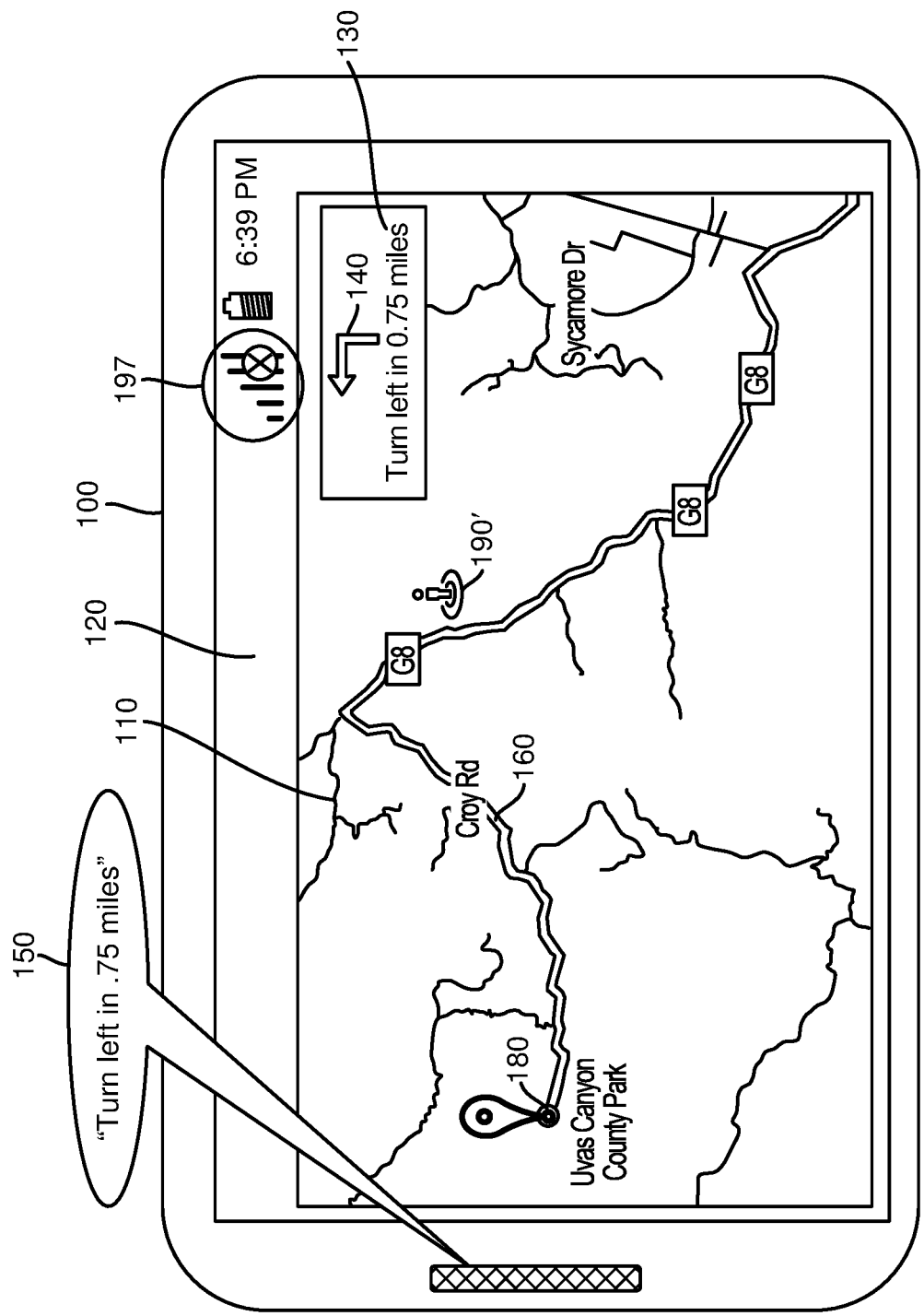
FIG. 1B illustrates an example image of a screen of a mobile device providing navigation to a user along the route of FIG. 1A, where the mobile device is located in a no wireless network coverage area.

FIG. 1B illustrates an example image of a screen of a mobile device providing navigation to a user along the route of FIG. 1A, where the mobile device is located in a no wireless network coverage area. Relative to FIG. 1A, the mobile device 100 has traversed much of the distance along navigation route 160 towards destination 180. As the mobile device 100 traverses route 160 away from, in this example, a heavily populated area, the present location of the mobile device 100 in FIG. 1B, as indicated by indication 190', is now in a no wireless network coverage area as indicated by no wireless signal indication 197. Since mobile device 100 is now in a no wireless network coverage area, the mobile device 100 cannot request and/or receive data. However, as illustrated, the mobile device 100 has already downloaded data for displaying map 110 and for navigation instructions 130, 140, 150.

Figure 1C:
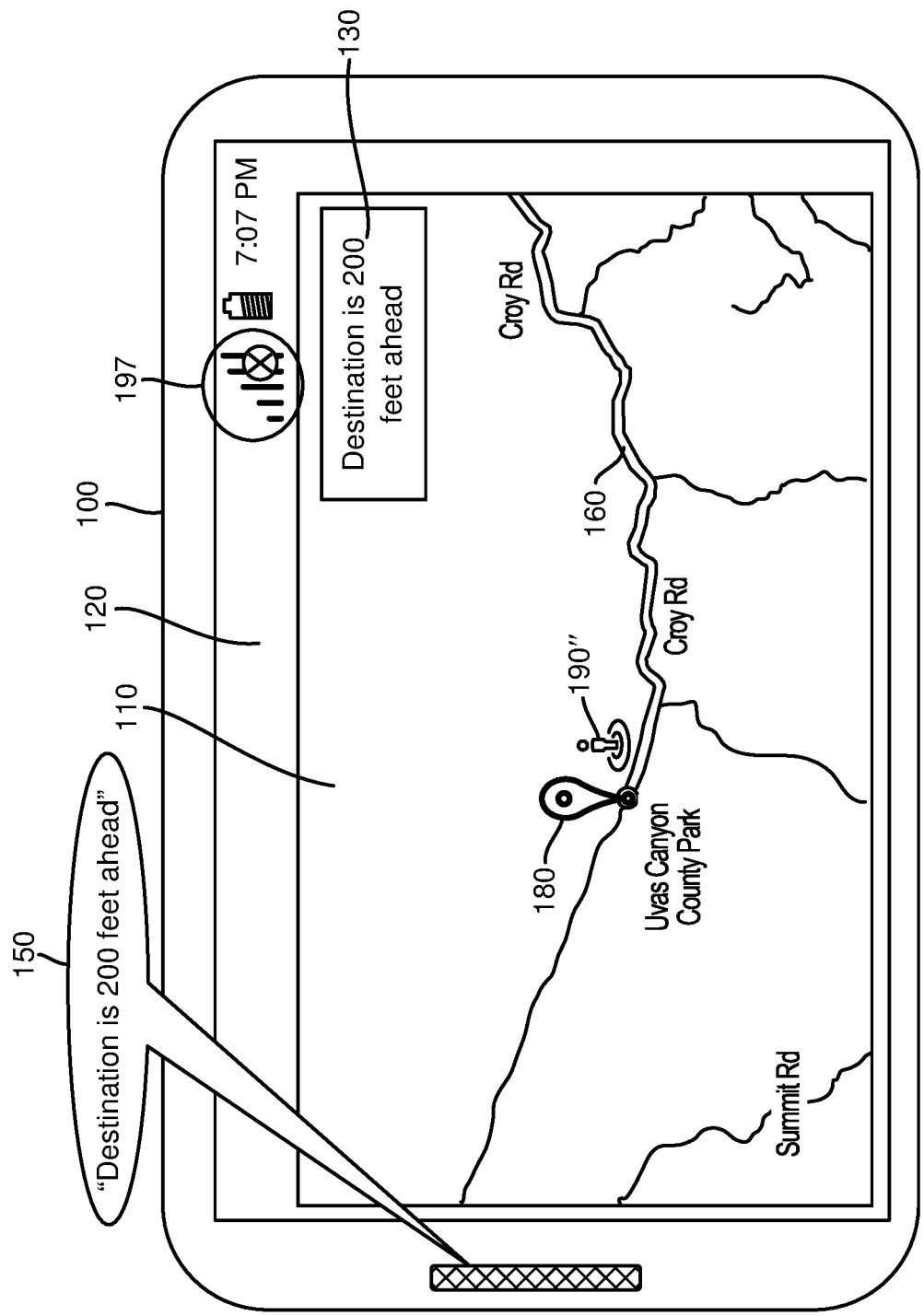
FIG. 1C illustrates an example image of a screen of a mobile device providing navigation to a user as the user nears the first destination, where the first destination is in a no wireless network coverage area.

FIG. 1C illustrates an example image of a screen of a mobile device providing navigation to a user as the user nears the first destination, where the first destination is in a no wireless network coverage area. Relative to FIGS. 1A and 1B, the mobile device 100 has arrived or almost arrived at the destination 180. The present location of the mobile device 100 in FIG. 1C, as indicated by indication 190", is in a no wireless network coverage area as indication by no wireless signal indication 197. As such, the mobile device cannot request and/or receive data at the destination 180.

Typically, when a mobile device completes navigation and a destination is reached, the map and/or route data can be erased from the memory of the device. This is because it is often assumed that once a subsequent navigation session away from the destination (which now becomes a second starting point) to a second destination begins, the mobile device can simply download the data to be used for the subsequent navigation session from the map and/or router server. However, as illustrated by no wireless signal indication 197, the mobile device 100 does not have access to a wireless signal at or near destination 180 and the destination 180 is therefore in a no wireless network coverage area. Hence, when a subsequent navigation session is to be initiated, the mobile device 100 may not have access to data to download anew map and route data for navigation away from destination 180 to a second destination. In such a case, it may be advantageous for the mobile device to cancel the default instruction to erase the map and/or route data from memory and to instead retain the map and/or route data in memory for subsequent navigation away from destination 180.

While the discussion above with respect to the mobile device 100 having no wireless network coverage, or being in a no wireless network coverage area, has been in the context of a WWAN, it is understood that one aspect of the present disclosure is that the mobile device has reached a destination 180 where the mobile device does not have access to a data network to download map and/or route data for subsequent navigation away from destination 180. Hence, the no wireless signal indication 197 (and the no wireless network coverage area) is, by extension, intended to indicate that the mobile device 100 does not have access for downloading data for subsequent navigation away from destination 180, whether through a WWAN, a wireless local area network (WLAN), or even a wired data connection.

Figure 2A:
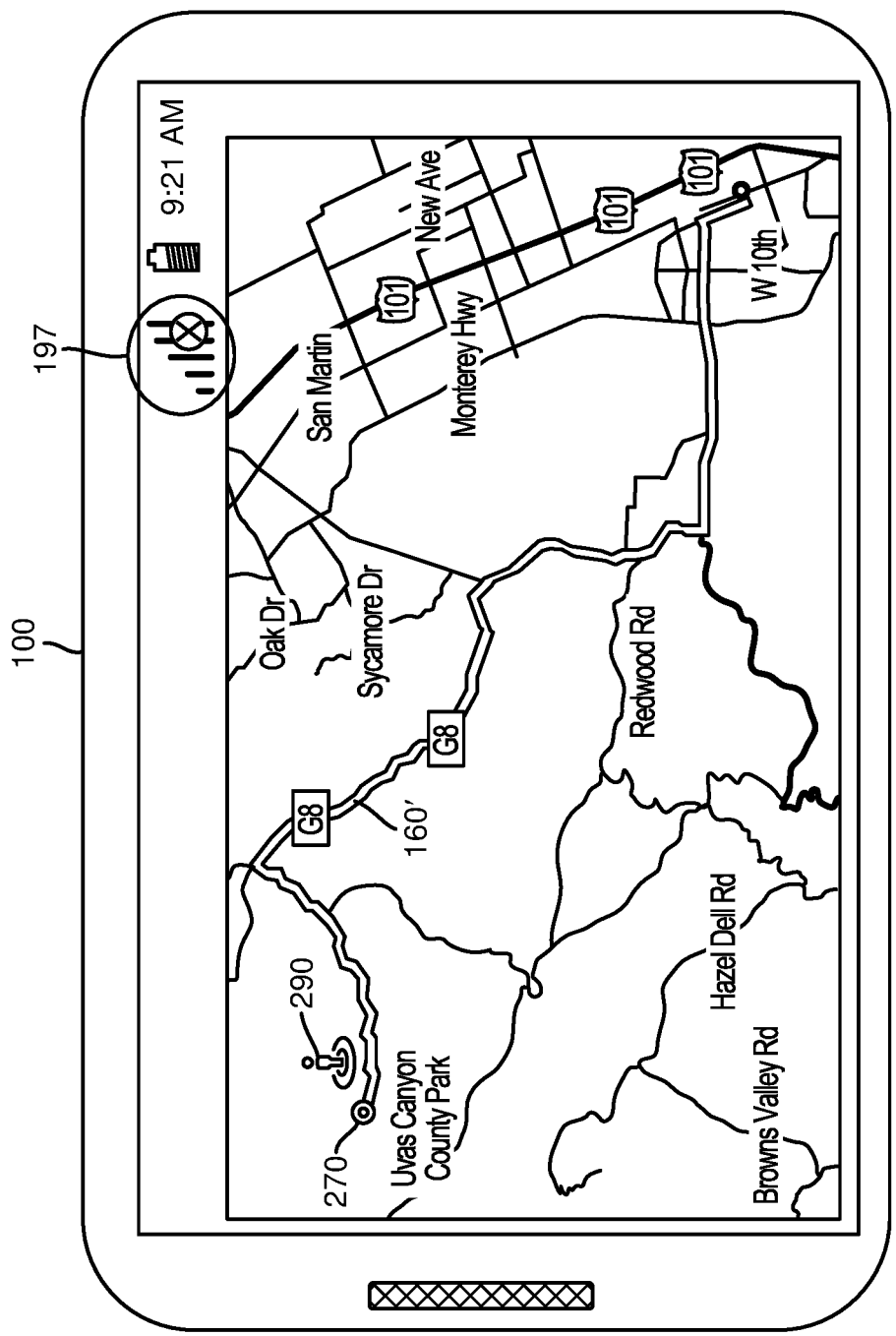
FIGS. 2A and 2B illustrate examples image of screens of a mobile device providing navigation to a user from a second starting point, where the mobile device is located in a no wireless network coverage area.
Figure 2B:
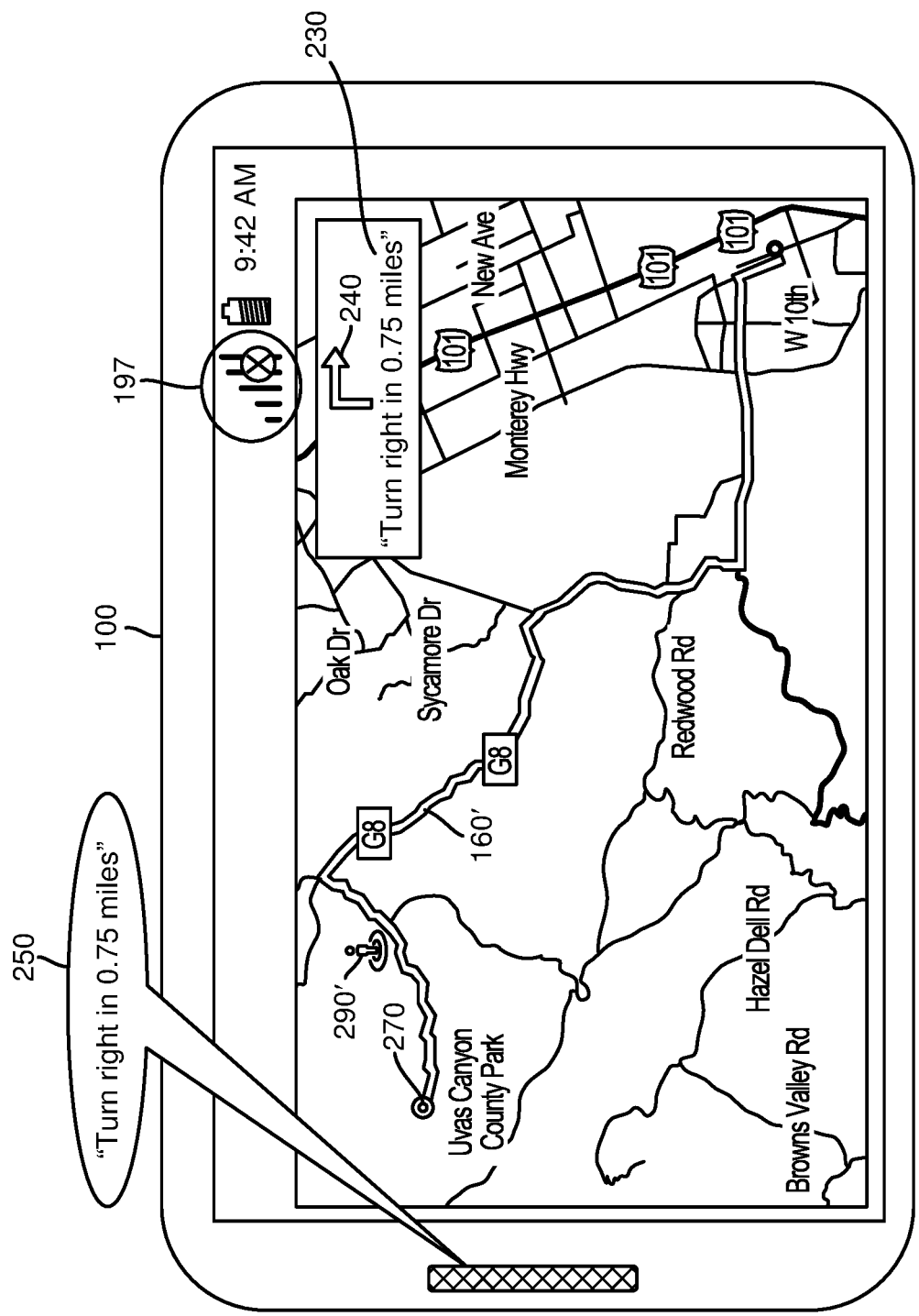

FIGS. 2A and 2B illustrate examples image of screens of a mobile device providing navigation to a user from a second starting point, where the mobile device is located in a no wireless network coverage area. In FIG. 2A, as shown by the indication 290, the mobile device 100 is at or near starting point 270, which may, for example, be a second starting point in the sense that it is a starting point that is different from starting point 170 of FIG. 1A. As illustrated, the starting point 270 corresponds to the destination 180 of FIGS. 1A, 1B, and 1C. As seen from no wireless signal indication 197, the mobile device is unable to access data for navigation away from starting point 270. However, as noted above, once the mobile device 100 reaches a destination, such as destination 180 of FIG. 1C, and determines that the destination is in a no wireless network coverage area or determines that it cannot access a data network, the mobile device can override an instruction to erase the map and/or route data from a previous navigation session or otherwise retain the map and/or route data to allow for subsequent navigation away from destination 180. Hence, in the example of FIG. 2A, although the mobile device 100 does not have access to a wireless network for download of data for navigation to a second destination from starting point 270, the mobile device, for example a processor within the mobile device, could have retained the map and/or route data in a memory from the previous navigation session to allow for navigation away starting point 270. Hence, mobile device may be capable of providing navigation instructions from starting point 270 using route 160' from FIGS. 1A, 1B, and 1C. Moving to FIG. 2B, the mobile device provides text-based navigation instructions 230, image-based navigation instructions 240, and/or audio-based navigation instructions 250 (referred to, collectively as navigation instructions 230, 240, 250) away from starting point 270 using route 160' from the previous navigation session of FIGS. 1A, 1B, and 1C. At the present location of mobile device 100 in FIG. 2B, indicated by indication 290', the mobile device 100 remains in a no wireless network coverage area as indicated by indication 197. Instructing the user to navigate along route 160' can be useful whether the second destination is the same as the starting point 170 of FIG. 1A or whether the second destination is different from starting point 170. If the second destination is the same as starting point 170, then the navigation route for the second destination will be the same as route 160'. But even if the second destination is different from starting point 170, the mobile device 100 can at least provide navigation away from starting point 270 until the mobile device reaches a wireless network coverage area. Once in the wireless network coverage area, the mobile device 100 may then download any map and/or route data for navigating to the second destination.

Figure 2C:
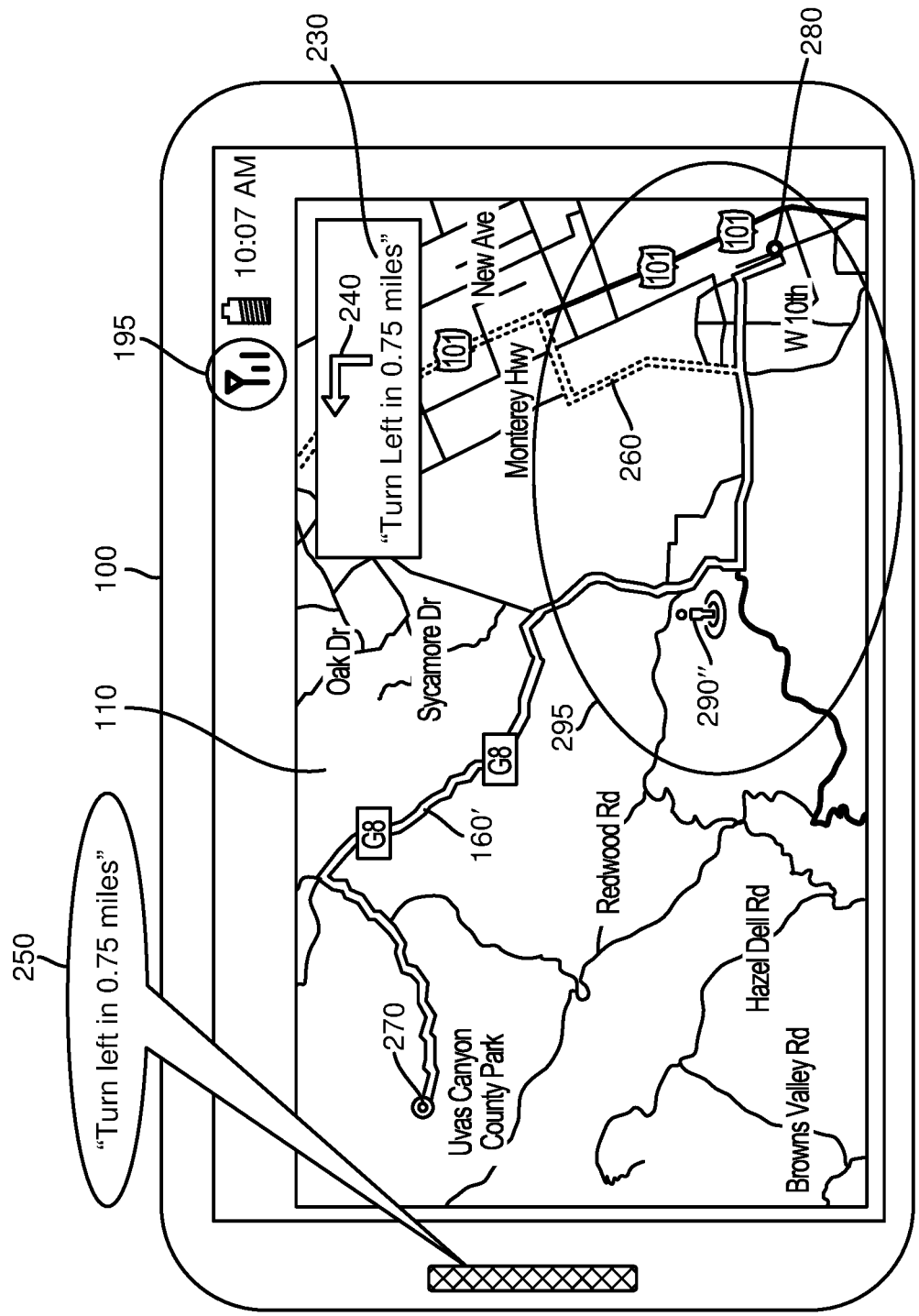
FIG. 2C illustrates an example image of a screen of a mobile device providing navigation to a user, where the mobile device is located in a wireless network coverage area.

FIG. 2C illustrates an example image of a screen of a mobile device providing navigation to a user, where the mobile device is located in a wireless network coverage area. Relative to FIGS. 2A and 2B, FIG. 2C illustrates the mobile device 100 providing navigation, for example by displaying map 110 and/or providing navigation instructions 230, 240, 250, along route 160' at a location that is further away from starting point 270. The present location of the mobile device 100 in FIG. 2C, as shown by indication 290", is within a wireless network coverage area 295, as indicated by wireless signal indication 195. Hence, at this point along the route 160', the mobile device 100 is capable of downloading new map and/or route data, in a scenario where a second destination is different from starting point 170. As illustrated in FIG. 2C, the destination 280 can correspond to starting point 170, and as such the route 160' will remain the same before or after reaching wireless network coverage area 295. However, in alternative implementations, as illustrated by alternative route 260, once the mobile device 100 has reached wireless network coverage area 295, the mobile device can download a new route, illustrated as alternative route 260, for navigation to a second destination (not illustrated) that is different from destination 280. It is understood that while route 160 of FIGS. 1A, 1B, and 1C is illustrated as the same as route 160' of FIGS. 2A, 2B, and 2C, it is understood that the navigation instructions provided for navigation to destination 180 in FIGS. 1A, 1B, and 1C will differ from the navigation instructions provided for navigation away from 270 in FIGS. 2A, 2B, and 2C even if the routes are similar. In some examples, route 160' is a reverse route relative to route 160.

Figure 3:
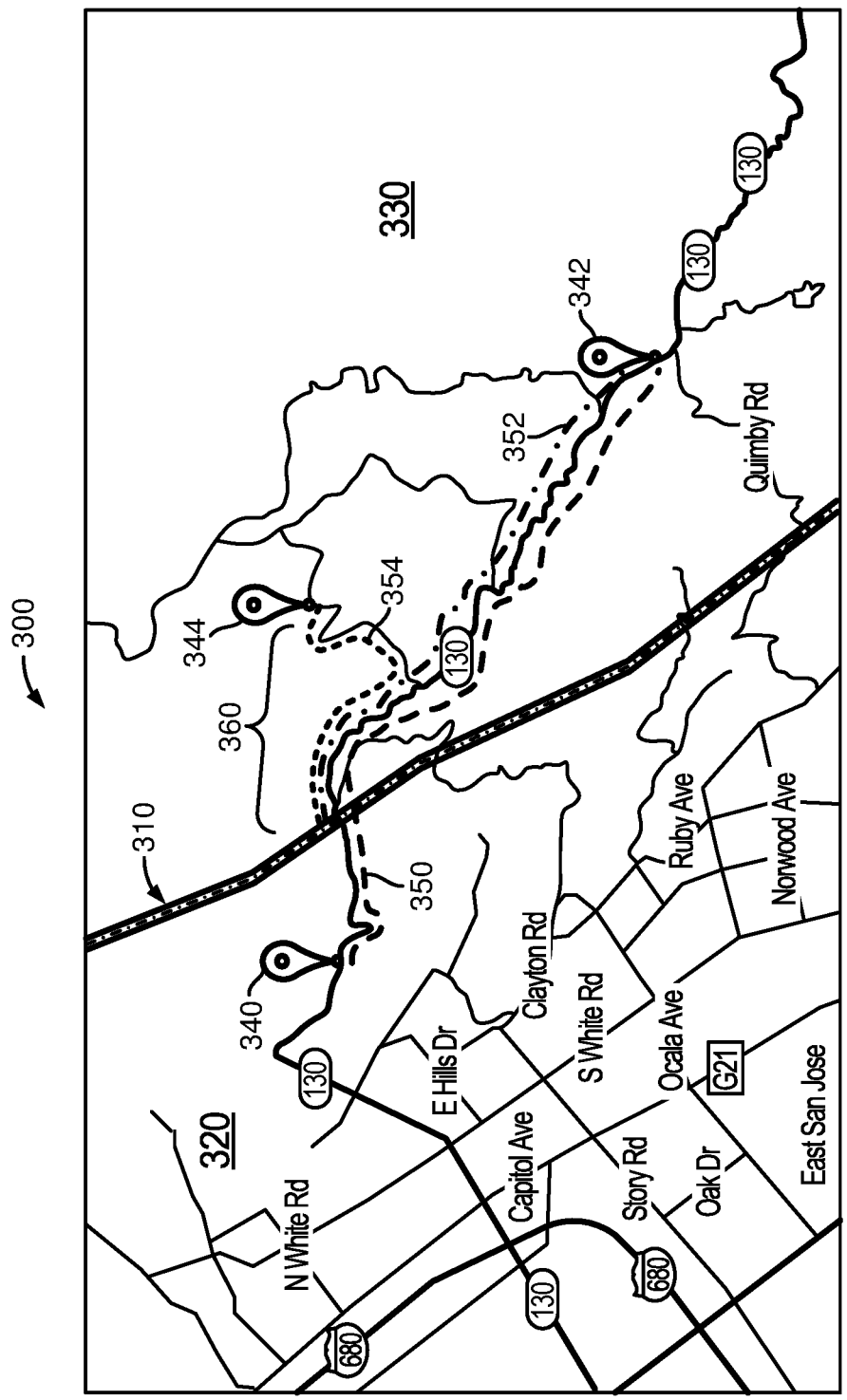
FIG. 3 illustrates an example of a map showing a first starting point in a wireless network coverage area and a first destination and the second destination both within a no wireless network coverage area.

FIG. 3 illustrates an example of a map showing a first starting point in a wireless network coverage area and a first destination and the second destination both within a no wireless network coverage area. Map 300 illustrates a boundary 310 between a wireless network coverage area 320 and a no wireless network coverage area 330. In this example, a first starting point 340 is within the wireless network coverage area 320, while a first destination 342 and a second destination 344 are within the no wireless network coverage area 330. As described in greater detail below with reference to FIGS. 4, 5, and 6, a user at first starting point 340 may enter the first destination 342 using a user interface on a mobile device, for example a graphical user interface displayed on a touchscreen of the mobile device and/or through an input device such as the touchscreen or a microphone on the mobile device. The mobile device may then receive the first destination 342 from the user interface.

As described in detail elsewhere herein, the mobile device can receive first route data for providing navigation instructions from first starting point 340 to first destination 342 along a first route 350 associated with the first route data.

Subsequent to reaching the first destination 342, a user may wish to navigate to the second destination 344. In the illustrated example, like the first destination 342, the second destination 344 is also in a no wireless network coverage area 330. When navigating to second destination 344 from first destination 342 (which can also be considered a second starting point), the mobile device may base the reverse first route 352 on the first route data received for the first route 350 that was retained in memory responsive to a determination that the first destination 342 is within a no wireless network coverage area 330. As illustrated, the second destination 344 is not along the first route 350 or the reverse first route 352 (both of which are based on the first route data), and as such, as the mobile device provides navigation instructions along reverse first route 352, such navigation instructions do not represent a direct navigation to the second destination 344. Rather, such navigation is intended to bring the mobile device to a wireless network coverage area where the mobile device, for example via a transceiver in communication with the wireless network, can request and receive second route data for navigation to the second destination. Hence, the mobile device may provide, through a user interface, navigation instructions along reverse first route 352 based on the first route data until the mobile device reaches a location along reverse first route 352 where wireless network coverage is available, in this illustration, some location near boundary 310 between wireless network coverage area 320 and no wireless network coverage area 330. Determining such a location within the wireless network coverage area could be made along the first route 350 to first destination 342, for example, by the mobile device annotating the first route 350 when it notices that wireless coverage is about to be lost. In the illustrated example, the mobile device could have annotated first route 350 at a location within the wireless network coverage area 320 near boundary 310 to indicate that such a location is within the wireless network coverage area. Subsequently, when navigating away from the first destination 342, the mobile device may provide navigation instructions along reverse first route 352 to the determined location within the wireless network coverage area based on the annotation in first route 350. Additionally or alternatively, while navigating along reverse first route 352, the mobile device may periodically scan for wireless signals and the location within the wireless network coverage area 320 can be determined based on such period scanning Hence, in such an implementation, the mobile device could indicate, via a user interface and/or an output device of the mobile device, that the navigation instructions to the second destination 344 based on the first route data comprise navigation instructions intended for reaching a wireless network coverage area 320.

As illustrated, once the second route data is received by the mobile device to provide navigation to the second destination 344, navigation instructions may include "backtracking" back along the reverse first route 352 as illustrated by section 360 along second route 354 and reverse first route 352. Although the navigation instructions from first destination 342 to second destination 344, represented in the combination of reverse first route 352 and the second route 354, was not a direct route and included a section 360 where the second route 354 traverses a portion of the reverse first route 352 in reverse, this can be superior to having no navigation capability at all between first destination 342 and second destination 344. Although illustrated in FIG. 3 as an example where first destination 342 and second destination 344 are both within a no wireless network coverage area 330, it is understood that in some other instances, even if the second destination 344 is within a wireless network coverage area 320, the second route 354 may include a section 360 common to both the reverse first route 352 and the second route 354. Additionally or alternatively, once the mobile device reaches the wireless network coverage area, it may take several minutes before the mobile device requests and receives the second route data for providing navigation instructions along second route 354 based on second route data. As such, section 360 may also include a portion where the overlap between reverse first route 352 and second route 354 is based on such time delay where mobile continues to provide navigation instructions based on the first route data while it transmits a request for, and receives, the second route data. It is understood that routes 350, 352, and 354 are shown next to roads, not superimposed over the roads, in order not to obscure the roads on which the routes traverse.

In one implementation, when the mobile device receives the second destination 344 from a user interface while at or near the first destination 342, the mobile device could perform a check to determine whether the second destination 344 is along the first route 350, or can otherwise be navigated to, based on the first route data. Responsive to a determination that the second destination 344 is not along the first route 350, the mobile device may, before providing the navigation instructions to the second destination based on the first route data retained in the memory of the mobile device, request feedback via an output device and/or a user interface regarding whether navigation instructions to a wireless network coverage area 320 is desired, and if a response is received via the user interface that such navigation is desired, the mobile device can provide navigation instructions to the second destination based upon the first route data, for example, along reverse first route 352. It is understood that, in cases where the second destination is not on the first route 350 or the reverse first route 352, navigation instructions to the second destination cannot be based on first route data alone, but will also include second route data that can be downloaded once a location along reverse first route 352 that is within the wireless network coverage area is reached.

With reference to previous figures, the discussion was based on the assumption that, whether the mobile device is within a wireless network coverage area or a no wireless network coverage area, the mobile device was able to determine its location. This can be accomplished, for example, using global navigation satellite system (GNSS) signals even when no wireless network coverage is available. Although GNSS signals are wireless signals, they provide limited data transfer and are generally not appropriate for transmitting map and/or route data, even if they may transfer some satellite-related data to allow a mobile device to determine its location. Furthermore, GNSS signals are generally signals that are received by the mobile device, and mobile device generally does not send signals to GNSS satellites to request data, for example, map and/or route data. Hence, as used herein, a wireless network coverage area is intended to refer to an area within which the mobile device may transmit and receive data, such as map and route data, to and from a wireless network.

Figure 4:
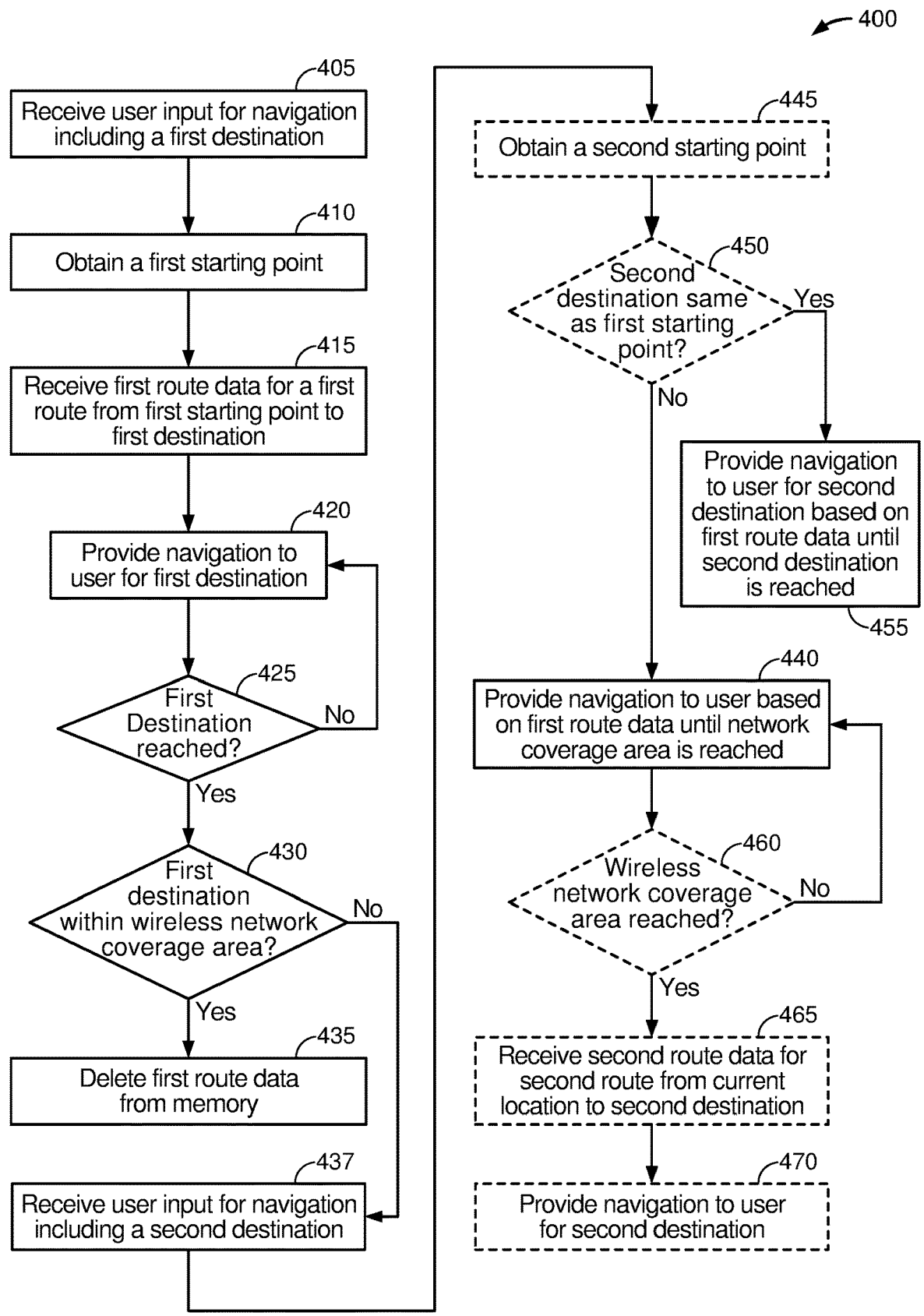
FIG. 4 illustrates an example method for providing navigation to a user.

FIG. 4 illustrates an example method for providing navigation to a user. The method 400 begins at block 405 where a mobile device can receive user input for navigation. The user input can include, for example, a first destination for a first navigation session. At block 410, the mobile device can obtain a first starting point. For example, the mobile device can determine its own location to obtain the first starting point. Alternatively, the first starting point can be input by the user. Based on the starting point and on the first destination, the mobile device can request map and/or route data from one or more servers, for example a map server and/or a route server. Upon receiving the starting point and the first destination, the map server and/or the route server can obtain map data and compute a route from the starting point to the first destination. In some implementations, the map server and the route server can be the same server. At block 415, the mobile device can receive first route data for a first route from the first starting point to the first destination. Based upon the received first route data, at block 420, the mobile device can provide navigation to a user for the first destination. The navigation provided to the user may also be additionally based upon map data as well as a periodically updated current location of the mobile device. As illustrated with decision block 425, as long as the first destination has not been reached, the method 400 continues to provide navigation at block 420. However, once the first destination has been reached, method 400 proceeds to block 430 with a determination as to whether the first destination is within a wireless network coverage area. The mobile device can scan to determine whether any WLAN signals, WWAN signals, personal area network (PAN) signals, such as Bluetooth or Zigbee signals, or other wireless signals capable of being used by the mobile device to request and/or receive map and/or route data are receivable at the first destination. If the first destination is within a wireless network coverage area, then the method 400 proceeds to block 435 where the mobile device can delete first route data from memory. This is often done to preserve free memory on the mobile device and not to have data unnecessarily filling memory resources of the mobile device. However, if the first destination is not within a wireless network coverage area, the method 400 proceeds to block 437 where the mobile device can receive user input for navigation including a second destination. In some implementations, the second destination may be the same as the first destination. In such an example, since the route information was not deleted and remains within the memory of the mobile device, the mobile device can provide navigation to the user as shown in blocks 440 and 455. Optionally, the method 400 may proceed from block 437 to block 445 where the mobile device can obtain a second starting point. This can be accomplished as described above with respect to block 410. In a case where the second starting point is too different from the first destination, or is not along the route taken to the first destination, the first route data may no longer be usable. As such, optionally, a comparison may be made between the second starting point and the route used to reach the first destination. If navigation using the first route data is not possible because the second starting point does not lie on or near the route corresponding to the first route data, then a message can be provided on a user interface indicating that navigation is not possible. At block 450, the mobile device can determine whether the second destination received from the user at block 437 is the same as the first starting point obtained at block 410. If it is, then the user is simply returning to the same place that the user came from. Alternatively, the mobile device can determine whether the second destination is along a route associated with the first route data such that the first route data retained in memory is sufficient to navigate the second destination. In either case, the first route data is sufficient to navigate the user back to the second destination. However, it is understood in such a case that navigation instructions for navigation from the first starting point to the first destination will differ from navigation instructions for navigation from the first destination back to the second destination, although such navigation instructions should be derivable from the first route data and hence are based on the first route data. Generally, the roads travelled will be the same, but turn-by-turn instructions at each intersection may change. However, in some situations, especially where there are one-way streets along the route, the streets involved in the route may be modified when navigation back to the first starting point from the first destination. As such, if it is determined at block 450 that the second destination is the same as the first starting point, or is otherwise along the route associated with the first route data and hence navigable based on the first route data, the method 400 proceeds to block 455 where the mobile device can provide navigation to the user for second destination based on the first route data received at block 415 and that was retained in memory after the first destination was reached in block 425 and it was determined that the first destination is not within a wireless network coverage area in block 430. At block 455, the mobile device provides navigation to the second destination based on the first route data until the second destination is reached. However, if the second destination is not the same as the first starting point, then the method 400 proceeds to block 440 where the mobile device provides navigation to the user based on the first route data. However, unlike block 455, in block 440 the mobile device will not provide the navigation to the user based on the first route data until the second destination is reached. Rather, the mobile device will provide navigation until a wireless network coverage area is reached. Then, the mobile device can request and receive second route data for navigation to the second destination and subsequently provide navigation to the second destination based on the second route data. Therefore, as shown in block 460, if a wireless network coverage area has not yet been reached, the mobile device will continue to provide navigation to the user based on the first route data at block 440. In some implementations, instead of soliciting and/or receiving input for the second destination at block 437, the second destination may be received only after the wireless network coverage area is reached. However, once a wireless network coverage area is reached, the method 400 proceeds to block 465 where the mobile device receives second route from the current location (the current location being the current location at the time of block 465) to the second destination. Prior to receiving the second route data, it is understood that the mobile device may have requested the second route data and may have provided one or more servers with the data to be used for the one or more servers to calculate and provide the route. At block 470, the mobile device provides navigation to the user for the second destination. As the second destination is not the same as the first starting point, based on the branching of the method 400 at block 450, the mobile device at block 470 can provide the navigation for the second destination based on the second route data received at block 465.

Figure 5:
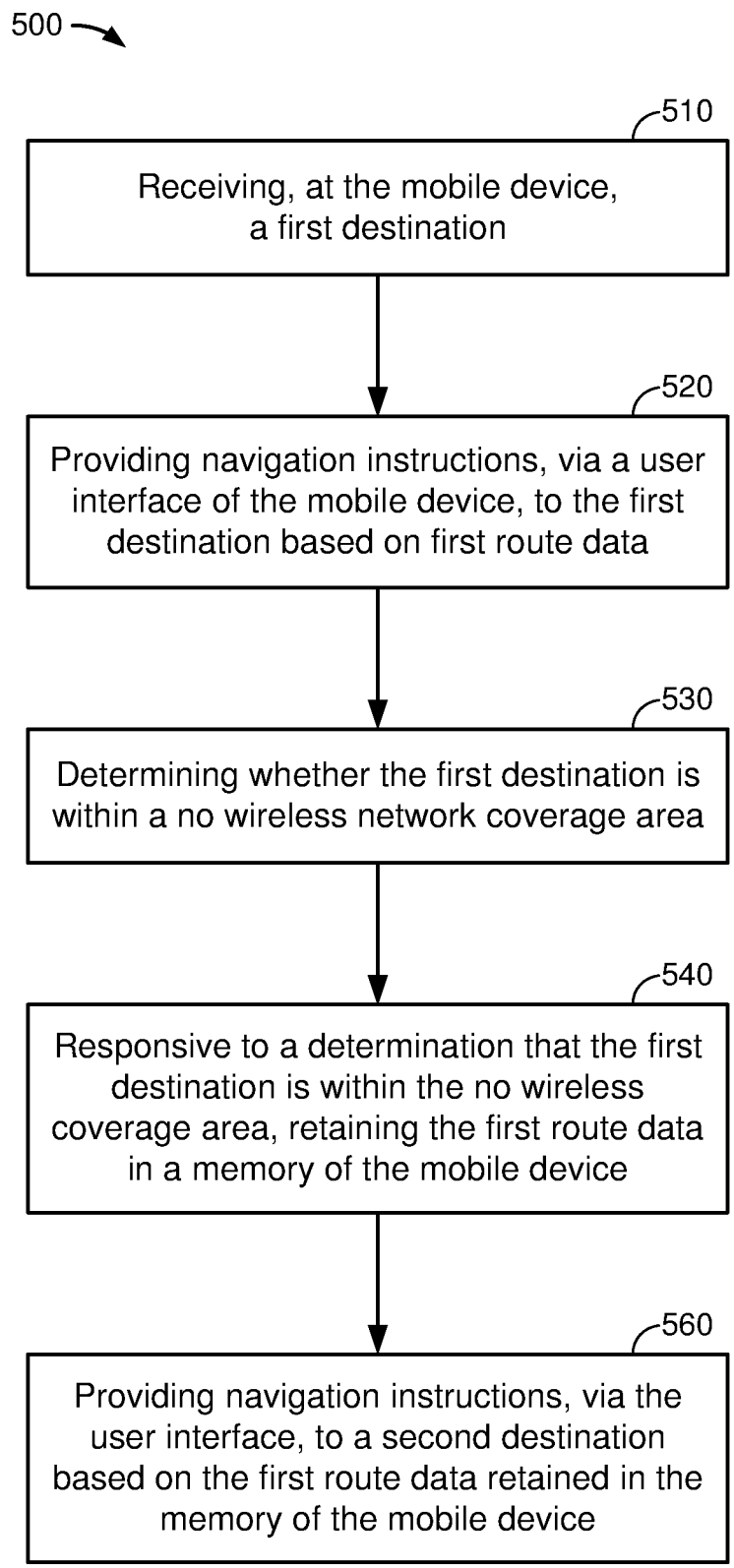
FIG. 5 illustrates an example method for providing navigation to a user where, responsive to a determination that a destination is in a no wireless network coverage area, the mobile device retains data for subsequent navigation away from the destination.

FIG. 5 illustrates an example method for providing navigation to a user where, responsive to a determination that a destination is in a no wireless network coverage area, the mobile device retains data for subsequent navigation away from the destination. The method 500 for providing navigation on the mobile device from a first destination with limited wireless data access begins at block 510 with receiving, at a mobile device, the first destination. The first destination can, for example, be received from a user interface on the mobile device. A user can input, for example, the first destination using the user interface, for example, by typing a name of a location into an input field on a touchscreen display of the mobile device or by tapping a location on an image of a map displayed on the mobile device to identify the location as the first destination. An input device and/or user interface of the mobile device, such as a touchscreen display, can display a graphical user interface and receive input from the user. The, for example, touchscreen display can generate signals based on the user input and transmit the signals to one or more processors of the mobile device and the one or more processors can receive the input from the, for example, touchscreen display. Aspects of block 510 can correspond to aspects of block 415 of FIG. 4, and as such, the teachings with reference to block 415 can also be applicable to block 510, and vice versa. Means for performing the functionality of block 510 can, but not necessarily, include, for example, any combination of user interface 750, microphone/speaker 752, keypad 754, display 756, memory 714, and processor 710 with reference to FIG. 7.

The method 500 continues at block 520 with providing navigation instructions, via a user interface of the mobile device, to the first destination based on first route data. With reference to FIGS. 1A, 1B, 1C, 2B and 2C, navigation instructions to the first destination (as well as navigation instructions to a second destination, to be discussed further below) can include text-based navigation instructions 130, 230; image-based navigation instructions 140, 240 (for example, non-textual visual navigation instructions); as well as audio-based navigation instructions 150, 250; or any combination thereof. Hence, one or more processors within the mobile device can provide commands to a user interface to provide navigation instructions 130, 140, 150, 230, 240, 250 to the user. The user interface can include, for example a speaker, a display (such as a touchscreen display), or both. Aspects of block 520 can correspond to aspects of blocks 420 and 425 of FIG. 4, and as such, the teachings with reference to blocks 420 and 425 can also be applicable to block 520, and vice versa. Means for performing the functionality of block 520 can, but not necessarily, include, for example, any combination of user interface 750, microphone/speaker 752, display 756, memory 714, and processor 710 with reference to FIG. 7.

In one embodiment, the first route data on which the navigation instructions to the first destination are based can be received from a route server. The route data can include map data, and hence the route data may alternatively or additionally be received from a map server. In some embodiments, the route server and the map server can be the same server. Hence, in some embodiments, the method 500 could include transmitting, to a server, a request for the first route data to the first destination, and receiving the first route data from the server. Hence, one or more processors within the mobile device can provide a command to a wireless transceiver to transmit the request to the server through a wireless network. The processor may also process the route data that is then received by the wireless transceiver in response to the request which the transceiver subsequently provides to the processor for processing. In some implementations, the first route data may be received in batches as the mobile device traverses the route on its way to the first destination. However, additionally or alternatively, the first route data for the entire route may be downloaded at a single time or in several batches while the mobile device remains in a wireless network coverage area or to otherwise optimize data traffic. Hence, in some implementations, the mobile device, for example one or more processors within the mobile device in communication with a transceiver, can be configured to request any remaining route data for navigation to the first destination responsive to a determination that wireless coverage may be lost soon, for example, if a wireless signal falls below a threshold. Such a request may optionally include a current location of the mobile device to enable the route server to compute a route from the current location of the mobile device to the first destination. As such, the method 500 could optionally include determining a location of the mobile device before transmitting the request for the first route data, wherein the request transmitted to the server includes the determined location of the mobile device. Such a location can be determined by, for example, a positioning engine or module which can receive inputs from an satellite positioning system (SPS) receiver, WWAN transceiver, WLAN transceiver, and/or motion sensors and compute an estimated position for the mobile device. The first route data can include one or more of a map, turn by turn instructions, traffic data, distance data, time to destination data, or any combination thereof.

The method 500 continues at block 530 with determining whether the first destination is within a no wireless network coverage area. In various implementations, determining whether the first destination is within a no wireless network coverage area can be performed before reaching the first destination and optionally confirmed upon reaching the first destination or can be performed after reaching the first destination. For example, the mobile device, for example one or more processors within the mobile device, can determine that the first destination is within a no wireless network coverage area based on data before the mobile device reaches the first destination, by receiving, for example, an indication that the first destination is within a no wireless network coverage area from a server, for example, a routing server or another server. Such data can be crowd-sourced based on reports by a plurality of mobile devices observing no wireless coverage in an area, and reporting such data to a server. Additionally or alternatively, a coverage map may be stored in the mobile device or received from a server such that the mobile device is capable of determining, before reaching the destination, that the destination is in a no wireless network coverage area. If it is known ahead of time that the first destination is within a no wireless network coverage area, then, optionally, the mobile device may request feedback using a user interface of the mobile device regarding whether route data, for example second route data, for a second destination from the first destination should be downloaded while the mobile device remains within the wireless network coverage area and before entering the no wireless network coverage area. Additionally or alternatively, the mobile device, for example one or more processors within the mobile device, can determine or confirm that the first destination is within the no wireless network coverage area after reaching the first destination based on a scan for wireless signals performed by the mobile device. For example, one or more processors within the mobile device can provide a command to a wireless transceiver, or a plurality of wireless transceivers within the mobile device where the plurality of wireless transceivers may relate to different radio access technologies, to perform a scan for wireless signals. The plurality of wireless transceivers can include WLAN transceivers or WWAN transceivers or any combination thereof. The WWAN transceivers can include Groupe Spécial Mobile (GSM), Universal Mobile Telecommunications System (UMTS), Long-Term Evolution (LTE), Code-Division Multiple Access (CDMA) or other wireless technologies that allow a mobile device to receive data, such as map and/or route data from a remote map and/or route server. The WLAN transceiver can include a transmitter conforming to the Institute for Electrical and Electronics Engineers (IEEE) 802.11 standard. Means for performing the functionality of block 530 can, but not necessarily, include, for example, any combination of a server (not illustrated), antenna(s) 702, WWAN transceiver 704, WLAN transceiver 706, memory 714, and processor 710 with reference to FIG. 7.

The method 500 continues at block 540 with retaining the first route data in a memory of the mobile device, responsive to a determination that the first destination is within the no wireless network coverage area. Hence, if it is determined in block 530 that the first destination is within a no wireless network coverage area, such as no wireless network coverage area 330 with reference to FIG. 3, then the first route data is retained in a memory of the mobile device. In one example, the memory can be a non-volatile memory. In such a case, were the first route data to initially have been stored in a volatile memory, one or more processors within the mobile device can provide a command to copy the data from the volatile memory to a non-volatile memory. In one example, retaining the first route data in a memory of the mobile device can simply mean that one or more processors within the mobile device do not issue a command to erase the first route data from memory, thereby retaining the first route data in memory. If it is determined at block 530 that the first destination is in fact within a wireless network coverage area, then, in some implementations, the first route data can be erased from memory. Since the mobile device can be expected to be within a wireless network coverage area next time a navigation application is begun, route data for navigation to a second destination, for example a second destination input by a user, can be easily downloaded using the wireless network covering the wireless network coverage area. As such, the first route can be erased from memory in some implementations. Aspects of blocks 530 and 540 can correspond to aspects of blocks 430 (including yes branch from block 430 to block 437) and 435 of FIG. 4, and as such, the teachings with reference to blocks 430 and 435 can also be applicable to blocks 530 and 540, and vice versa. Means for performing the functionality of block 540 can, but not necessarily, include, for example, any combination of processor 710 and memory 714 with reference to FIG. 7.

The method 500 continues at block 560 with providing navigation instructions, via the user interface of the mobile device, to a second destination based on the first route data retained in the memory of the mobile device. Aspects of block 560 can correspond to aspects of blocks 440, 450, 455, 460, 465, and 470 of FIG. 4, and as such, the teachings with reference to these blocks can also be applicable to block 560, and vice versa. The second destination may be received, as described below with reference to block 650 of FIG. 6, before providing the navigation instructions of block 560. Alternatively, the second destination may be received, for example by being entered by a user via a user interface, after a wireless network coverage area is reached. Hence, as described above with reference to FIG. 3, providing navigation instructions to the second destination based on the first route data retained in memory can optionally include providing navigation instructions simply to reach a wireless network coverage area in order to then prompt, via the user interface, a user to then enter the second destination. As such, in some scenarios, providing navigation instructions to the second destination based on the first route data can include providing navigation instructions to return to the wireless network coverage area before the user has provided the second destination via the user interface. Means for performing the functionality of block 560 can, but not necessarily, be similar to those described above with reference to block 520.

In one embodiment, the method 500 can optionally include after receiving a second input for navigation and before providing the navigation instructions to a second destination based on the first route data (block 560), attempting to transmit, to the routing server, a request for second route data to the second destination. In an implementation where the second destination is not along the first route associated with the first route data and a second, different route should be computed, the mobile device may attempt to transmit a request for second route data for the second destination. Even if the mobile device had previously determined that the first destination, for example, is in a no wireless network coverage area, the mobile device may still attempt to transmit a request as wireless network coverage may have only been previously unavailable on a temporary basis, and a subsequent request for the second route data may be successful. Hence, the mobile device can confirm that the mobile device is in the no wireless network coverage area before providing the navigation instructions to the second destination based on the first route data. Responsive to a confirmation that the mobile device is within the no wireless network coverage area, the method 500 may optionally include providing the navigation instructions to the second destination based on the first route data retained in the memory of the mobile device. Even if the second destination is not along a route associated with the first route data, the navigation instructions based on the first route data should eventually lead the user navigating according to the navigation instructions back to a wireless network coverage area. Therefore method 500 may also optionally include determining that the second destination is not along a route associated with the first route data. Then, responsive to the determination that the second destination is not along the route associated with the first route data, providing the navigation instructions to the second destination based on the first route data retained in the memory of the mobile device until a wireless network coverage area is reached. The method 500 may then further include determining that the wireless network coverage area is reached and, responsive to the determination that the wireless network coverage area is reached, transmitting, to the routing server, a request for second route data to the second destination. The request for second route data to the second destination can then include the updated location of the mobile device at or near the point at which the wireless network coverage is reached by the mobile device, to enable the route server to respond by sending the second route data from the updated location of the mobile device to the second destination.

Figure 6:
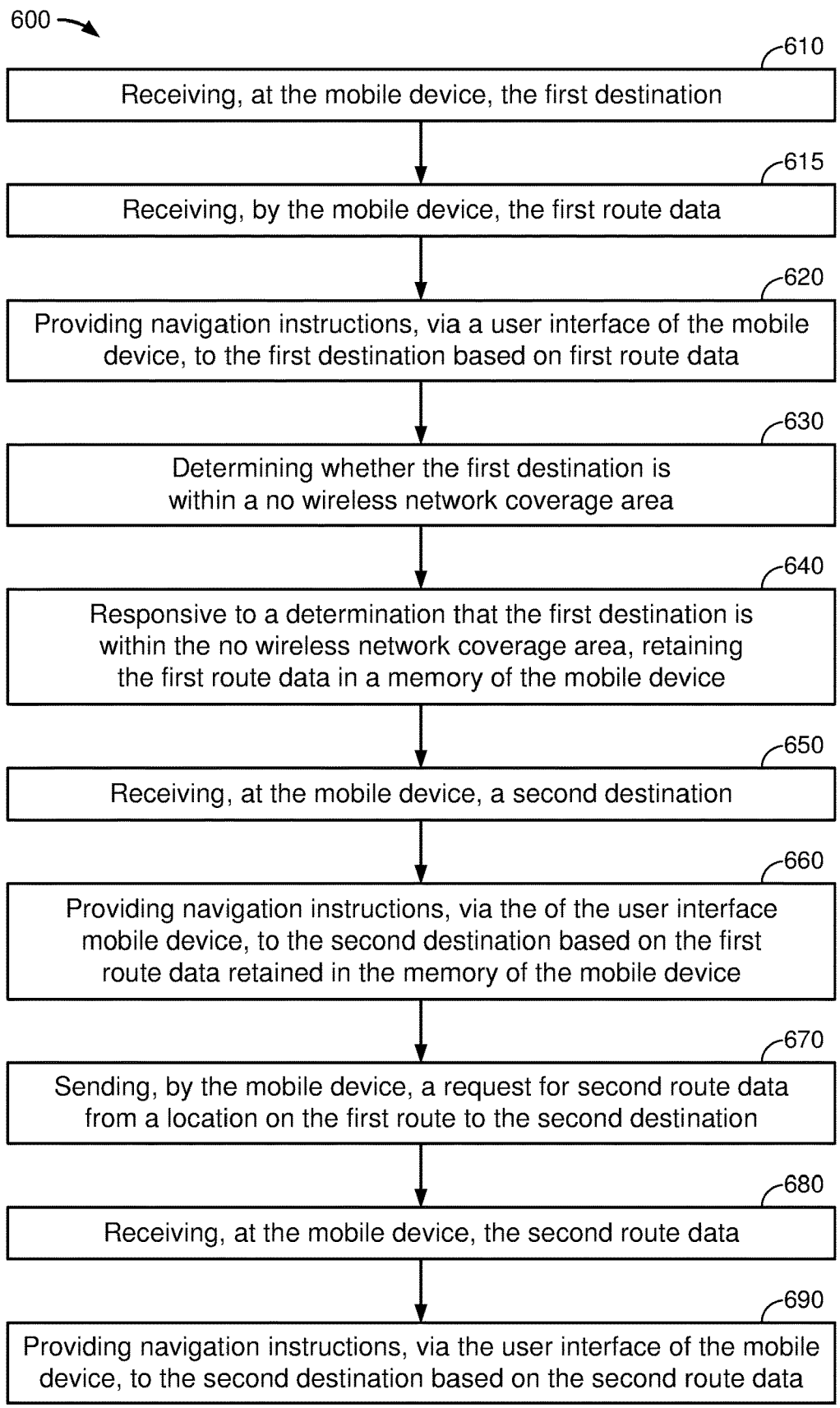
FIG. 6 illustrates another example method for providing navigation to a user where, responsive to a determination that a destination is in a no wireless network coverage area, the mobile device retains data for subsequent navigation away from the destination.

FIG. 6 illustrates another example method for providing navigation to a user where, responsive to a determination that a destination is in a no wireless network coverage area, the mobile device retains data for subsequent navigation away from the destination. Comparing FIG. 6 to previously described FIG. 5, method 600 includes the same blocks as method 500, but further adds optional blocks 615, 650, 670, 680, and 690. Otherwise, block 610 corresponds to block 510, block 520 corresponds to block 520, and so on. Method 600 proceeds from block 610, which corresponds to block 510 described above, to block 615 with receiving, by the mobile device, the first route data. As described above, the mobile device, for example one or more processors in communication with and receiving data from a transceiver, can receive the first route data from a server via a wireless network. Prior to block 615, optionally, the mobile device, for example one or more processors in communication with and controlling the transceiver, could transmit a request for the first route data to the server via the wireless network. Means for performing the functionality of block 615 can, but not necessarily, include, for example, any combination of a server (not illustrated), antenna(s) 702, WWAN transceiver 704, WLAN transceiver 706, processor 710, and memory 714 with reference to FIG. 7.

Method 600 continues from block 615 to blocks 620, 630, and 640 which correspond to blocks 520, 530, and 540 with reference to FIG. 5. From block 640 method 600 continues at block 650 with receiving, at the mobile device, a second destination. The second input for navigation can be received in a manner similar to receiving the first input at block 510. Aspects of block 650 can correspond to aspects of block 437 of FIG. 4, and as such, the teachings with reference to block 437 can also be applicable to block 650, and vice versa. Means for performing the functionality of block 650 can, but not necessarily, be similar to those described above with reference to block 510.

Method 600 continues at block 660, which corresponds to block 560 with reference to FIG. 5. From block 660, method 600 proceeds to block 670 with sending, by the mobile device, a request for second route data from a location on the first route to the second destination. As noted above in the discussions with reference to FIGS. 3, 4, and 5, providing navigation instructions to the second destination based on the first route data as in block 560 and 650, particularly in situations where the second destination is not on the first route or reverse first route, will at some point bring the mobile device back to an area with wireless network coverage to allow the mobile device to request second route data from the location at or near which the connection to the network is established to the second destination. Responsive to a determination that the mobile is now in a wireless network coverage area 320 (with reference to FIG. 3), the mobile device can request second route data from the location at or near which such determination is made to the second destination. The sending of the request can entail, for example, one or more processors in the mobile device in communication with and controlling a transceiver of the mobile device, transmitting via the transceiver a request to a server for second route data by means of the wireless network. Means for performing the functionality of block 670 can, but not necessarily, include, for example, any combination of antenna(s) 702, WWAN transceiver 704, WLAN transceiver 706, processor 710, and memory 714 with reference to FIG. 7.

Method 600 continues at block 680 with receiving, at the mobile device, the second route data. This can be performed as described elsewhere herein, for example, as described with reference to block 615.

Method 600 continues at block 690 with providing navigation instructions, via the user interface of the mobile device, to the second destination based on the second route data. While block 660 and 690 have some similarities, it is noted that providing the navigation instructions to the second destination based on the first route data will more generally be intended simply to reach a wireless network coverage area so that the second route data to the second destination can be requested and received, although there may be cases where the second destination falls along the first route or the reverse first route. On the other hand, block 690 indicates that, once the wireless network coverage area has been reached, and the second route data is now available within the mobile device, navigation instructions proceed based on the second, not first, route data. Means for performing the functionality of block 690 can, but not necessarily, include, those described above with reference to blocks 520 and/or 560.

Figure 7:
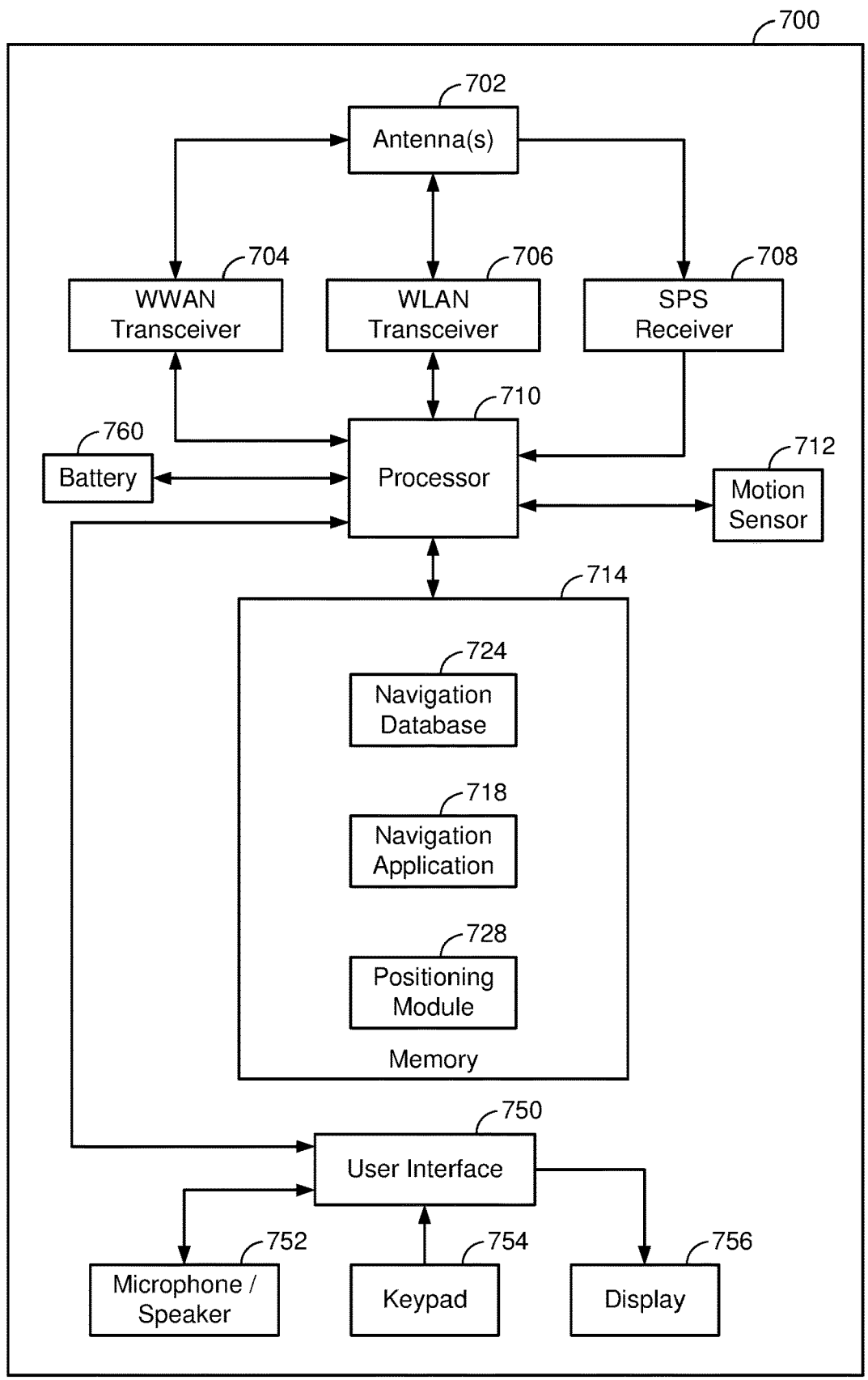
FIG. 7 illustrates an exemplary mobile device that may be used to determine position and to provide navigation to a user.

FIG. 7 illustrates an exemplary mobile device that may be used to determine position and to provide navigation to a user as described above with reference to the methods of FIGS. 4, 5, and 6. FIG. 7 is a block diagram illustrating various components of an exemplary mobile device 700. For the sake of simplicity, the various features and functions illustrated in the box diagram of FIG. 7 are connected together using a common bus, which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 7 may be further subdivided or two or more of the features or functions illustrated in FIG. 7 may be combined.

The mobile device 700 may include one or more WWAN transceiver(s) 704 that may be connected to one or more antennas 702. The WWAN transceiver 704 comprises suitable devices, hardware, and/or software for communicating with and/or detecting signals to/from WWAN access points and/or directly with other wireless devices within a network. In one aspect, the WWAN transceiver 704 may comprise a CDMA communication system suitable for communicating with a CDMA network of wireless base stations; however in other aspects, the wireless communication system may comprise another type of cellular telephony network, such as, for example, TDMA, LTE, or GSM. Additionally, any other type of wide area wireless networking technologies may be used, for example, WiMAX (IEEE 802.16), etc. The mobile device 700 may also include one or more WLAN transceivers (such as illustrated WLAN transceiver 706) that may be connected to one or more antennas 702. The WLAN transceiver 706 comprises suitable devices, hardware, and/ or software for communicating with and/or detecting signals to/from WLAN access points and/or directly with other wireless devices within a network. In one aspect, the WLAN transceiver 706 may comprise a Wi-Fi (IEEE 802.11x) communication system suitable for communicating with one or more wireless access points; however in other aspects, the WLAN transceiver 706 comprise another type of local area network or PAN. Additionally, any other type of wireless networking technologies may be used, for example, Ultra Wide Band, Bluetooth, ZigBee, wireless USB, etc.

As used herein, the abbreviated term wireless access point (WAP) may be used to refer to WLAN WAP and/or WWAN-WAPs. Specifically, in the description presented below, when the term "WAP" is used, it should be understood that embodiments may include a mobile device 700 that can exploit signals from a plurality of WLAN-WAPs, a plurality of WWAN-WAPs, or any combination of the two. The specific type of WAP being utilized by the mobile device 700 may depend upon the environment of operation. Moreover, the mobile device 700 may dynamically select between the various types of WAPs in order to transmit and/or receive data useful for navigation, including, for example, map data or route data (which could include map data). Alternatively, as may be described further below, the various WAPs may be used to arrive at an accurate position solution for a current location of the mobile device.

An SPS receiver 708 may also be included in the mobile device 700. The SPS receiver 708 may be connected to the one or more antennas 702 for receiving satellite signals. The SPS receiver 708 may comprise any suitable hardware and/or software for receiving and processing SPS signals. The SPS receiver 708 requests information and operations as appropriate from the other systems, and performs the calculations necessary to determine the mobile device's 700 position using measurements obtained by any suitable SPS algorithm. For example, the SPS receiver 708 can determine a position of the mobile device as discussed above with reference to FIGS. 4, 5 and 6.

A motion sensor 712 may be coupled to a processor 710 to provide movement and/or orientation information, which is independent of motion data derived from signals, received by the WWAN transceiver 704, the WLAN transceiver 706 and the SPS receiver 708.

By way of example, the motion sensor 712 may utilize an accelerometer (e.g., a microelectromechanical systems device), a gyroscope, a geomagnetic sensor (e.g., a compass), an altimeter (e.g., a barometric pressure altimeter), and/or any other type of movement detection sensor. Moreover, the motion sensor 712 may include a plurality of different types of devices and combine their outputs in order to provide motion information. For example, the motion sensor 712 may use a combination of a multi-axis accelerometer and orientation sensors to provide the ability to compute positions in 2-D and/or 3-D coordinate systems.

The processor 710 may be connected to the WWAN transceiver 704, WLAN transceiver 706, the SPS receiver 708 and the motion sensor 712. The processor 710 may include one or more microprocessors, microcontrollers, and/ or digital signal processors that provide processing functions, as well as other calculation and control functionality. The processor 710 may also include memory 714 for storing data and software instructions for executing programmed functionality within the mobile device 700. The memory 714 may be on-board the processor 710 (e.g., within the same integrated circuit package), and/or the memory may be external memory to the processor and functionally coupled over a data bus. The functional details associated with aspects of the disclosure will be discussed in more detail below.

A number of software modules and data tables may reside in memory 714 and be utilized by the processor 710 in order to manage both communications and positioning determination functionality. As illustrated in FIG. 7, memory 714 may include and/or otherwise receive a navigation application 718 for providing navigation instructions to a user, and a positioning module 728. One should appreciate that the organization of the memory contents as shown in FIG. 7 is merely exemplary, and as such the functionality of the modules and/or data structures may be combined, separated, and/or be structured in different ways depending upon the implementation of the mobile device 700. Furthermore, in one embodiment, a battery 760 may be coupled to the processor 710, wherein the battery 760 may supply power to the processor 710 and various other modules and components located on the mobile device 700 through appropriate circuitry and/or under control of the processor 710.

The navigation application 718 may be a process running on the processor 710 of the mobile device 700, which requests position information from the positioning module 728. Based upon the position information received from the positioning module 728, the navigation application 718 can provide navigation instructions in accordance with route data for a given route to a given destination. The navigation database 724 may include data for one or more routes or one or more maps that include various road segments, wherein the navigation database 724 may associate each road segment with an index or other information to identify the particular road segment, a start position and an end position (e.g., expressed using coordinates related to a given positioning system or other suitable data), and/or additional information that may be relevant to a navigation context (e.g., a speed limit). In one example, the navigation database 724 can include first route data to a first destination and second route data to a second destination as described elsewhere herein.

The positioning module 728 can be capable of determining a position based on inputs from wireless signal measurements from WWAN transceiver 704, signal measurements WLAN transceiver 706, data received from SPS receiver 708, and/or data from motion sensor 712.

While the modules shown in FIG. 7 are illustrated in the example as being contained in the memory 714, it is recognized that in certain implementations such procedures may be provided for or otherwise operatively arranged using other or additional mechanisms. For example, all or part of the positioning module 728 and/or the navigation application 718 may be provided in firmware. Additionally, while in this example the positioning module 728 and the navigation application 718 are illustrated as being separate features, it is recognized, for example, that such procedures may be combined together as one procedure or perhaps with other procedures, or otherwise further divided into a plurality of sub-procedures.

In many embodiments, the memory 714 can include many different kinds of memory and is only illustrated schematically. Memory 714 can include a non-transitory computer readable medium, which may include a read-only memory (ROM) device. The memory 714 may comprise software elements, including an operating system, device drivers, executable libraries, and/or other code, such as the illustrated navigation application 718. The navigation application can comprise one or more computer programs provided by various embodiments, and/or may be designed to implement methods, and/or configure systems, provided by other embodiments, as described herein, for example, with reference to FIGS. 4, 5, and 6. Merely by way of example, one or more procedures described with respect to the method(s) discussed above might be implemented as code and/or instructions executable by a computer (and/or a processor within a computer), in an aspect, then, such code and/or instructions may be used to configure and/or adapt a general purpose computer (or other device) to perform one or more operations in accordance with the described methods.

As described elsewhere in greater detail, such instructions stored on a non-transitory computer readable medium for execution by one or more processors of a mobile device may, in various implementations, include instructions to perform operations corresponding to any of the functions disclosed herein, for example those illustrated in FIGS. 4, 5, and 6, the operations comprising, for example, receiving, using a user interface of the mobile device, the first destination; providing navigation instructions, using the user interface, to the first destination based on first route data; determining whether the first destination is within a no wireless network coverage area; responsive to a determination that the first destination is within the no wireless network coverage area, retaining the first route data in a memory of the mobile device; and providing navigation instructions, using the user interface, to a second destination based on the first route data retained in the memory of the mobile device. The operations to be performed in accordance with the instructions can further include determining that a wireless coverage area has been reached, and, receiving second route data for the second destination after the wireless coverage area has been reached.

The mobile device 700 may include a user interface 750, which provides any suitable interface systems, such as a microphone/speaker 752, keypad 754, and display 756 that allows user interaction with the mobile device 700. The microphone/speaker 752 provides for voice communication services using the WWAN transceiver 704 and/or the WLAN transceiver 706. Additionally, the microphone/speaker 752 can provide audio-based navigation instructions as described above. Although illustrated as a single device, it is understood that microphone/speaker 752 may comprise a separate microphone device and a separate speaker device. The keypad 754 comprises any suitable buttons for user input. The display 756 comprises any suitable display, such as, for example, an liquid crystal display, and may further include a touchscreen display for additional user input modes. The user interface 750 is illustrated as a hardware user interface 750, however, can also be understood to include a graphical user interface displayed on a touchscreen allowing output to a user and receipt of input from the user. Input from, and output to, user can be mediated through the user interface 750 such that the mobile device, for example the processor 710 or other components, can receive user input from the user interface 750 and provide output to the user to the user interface 750.

The processor 710 may include any form of logic suitable for performing at least the techniques provided herein, for example any of the methods described with reference to FIGS. 4-6. For example, the processor 710 (which may include one or more processors within the mobile device 700) can be coupled to the memory 714, user interface (including, for example, keypad 754, display 756, microphone/speaker 752, or a combination thereof), positioning module 728, and the wireless transceiver (such as WWAN transceiver 704 and/or WLAN transceiver 706). The one or more processors and the memory can together be configured to, for example, based on instructions in the memory 714 perform any of the aspects of method 400, 500, or 600 described above with reference to FIGS. 4, 5, and 6. More particularly, one or more processors such as processor 710 coupled to the memory 714 can together configured to receive, via the user interface 750 (for example, keypad 754 and/or display 756), a first input for navigation, the first input including a first destination; provide, via the user interface 750 (for example, microphone/speaker 752 and/or display 756), navigation instructions to the first destination based on first route data; determine whether the first destination is within a no wireless network coverage area, for example, by receiving an indication based on crowdsourced data, by historical data stored by the mobile device 700 itself, or by a scan using WWAN transceiver 704 and/or WLAN transceiver 706; responsive to a determination that the first destination is within the no wireless network coverage area, retain the first route data in the memory 714 of the mobile device 700; receive, via the user interface 750 (such as keypad 754 and/or display 756), a second input for navigation, the second input including a second destination; and provide, via microphone/speaker 752 and/or display 756, navigation instructions to the second destination based on the first route data retained in the memory of the mobile device. Memory 714 can, in some embodiments, include both volatile and non-volatile memory. In one embodiment, retaining the first route data in the memory 714 includes retaining the first route data in a non-volatile memory.

Processor 710 and the memory 714 together can further be configured to transmit, via the wireless transceiver, such as WWAN transceiver 704 and/or WLAN transceiver 706, to a server, a request for the first route data to the first destination and to receive, via the wireless transceiver, the first route data from the server. Where useful, the request for the first route data can include a location of the mobile device 700 to enable the server to compute a route from the location of the mobile device to the first destination. As such, processor 710 and the memory 714 can together further be configured to determine, via the positioning module 728, a location of the mobile device 700 before transmitting the request for the first route data, wherein the request includes the determined location of the mobile device 700. As described above with reference to FIGS. 4-6, in some implementations, navigation instructions are provided for a second destination based on the first route data until the mobile device enters or is within a wireless network coverage area so that a second route can be computed to the second destination. As such, the processor 710 can, by sending commands to, and receiving data from, WWAN transceiver 704 and/or WLAN transceiver 706, determine that wireless network coverage area is reached, and, responsive to the determination that the wireless network coverage area is reached, transmitting, via WWAN transceiver 704 and/or WLAN transceiver 706, to the server, a request for second route data to the second destination. Once the second route data is receive in response to the request, the processor 710 can provide, via the user interface, navigation instructions to the second destination based on the second route data.

As discussed above, processor 710 and the memory 714 can be configured to provide, via the user interface, navigation instructions to a first destination and/or to a second destination. In some embodiments, such navigation instructions can include outputting image-based navigation instructions on the display 756, outputting text-based navigation instructions on the display 756, or outputting audio-based navigation instructions via the microphone/speaker 752.

As used herein, the mobile device 700 may be any portable or movable device or machine that is configurable to acquire wireless signals transmitted from, and transmit wireless signals to, one or more wireless communication devices or networks. As shown in FIG. 7, the mobile device 700 may be representative of such a portable wireless device. Thus, by way of example but not limitation, the mobile device 700 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device, which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

The invention claimed is:

1. A method for providing navigation on a mobile device comprising:
    receiving, at the mobile device, a first destination;
    providing navigation instructions, via a user interface of the mobile device, to the first destination based on first route data;
    determining whether the first destination is within a no wireless network coverage area;
    responsive to a determination that the first destination is within the no wireless network coverage area, retaining the first route data in a memory of the mobile device;
    receiving, at the mobile device, a second destination;
    responsive to a determination that the second destination is not along a route associated with the first route data, providing navigation instructions, via the user interface, based on the first route data to a wireless network coverage area; and
    responsive to a determination that the mobile device is within the wireless network coverage area, obtaining second route data to the second destination.

2. The method of claim 1,
    wherein the obtaining second route data to the second destination comprises:
    transmitting, to a server, a request for second route data to the second destination;
    receiving, responsive to the request, the second route data to the second destination from the server.

3. The method of claim 2, further comprising:
    providing navigation instructions, via the user interface, to the second destination based on the second route data.

4. The method of claim 1, further comprising:
    indicating, via the user interface, that the navigation instructions to the second destination based on the first route data comprise navigation instructions is intended for reaching the wireless network coverage area.

5. The method of claim 1, further comprising:
    before providing the navigation instructions to the second destination based on the first route data retained in the memory of the mobile device, requesting feedback, via the user interface, regarding whether navigation instructions to a wireless network coverage area is desired.

6. The method of claim 1, wherein the navigation instructions to the first destination or the second destination comprise image-based navigation instructions, text-based navigation instructions, or audio-based navigation instructions, or any combination thereof.

7. The method of claim 1, wherein determining whether the first destination is within the no wireless network coverage area comprises determining that the first destination is within the no wireless network coverage area based on data before the mobile device reaches the first destination.

8. The method of claim 1, wherein determining whether the first destination is within the no wireless network coverage area comprises determining that the first destination is within the no wireless network coverage area after reaching the first destination based on a scan for wireless signals performed by the mobile device.

9. The method of claim 1, wherein the memory of the mobile device is a non-volatile memory.

10. A mobile device comprising:
a wireless transceiver;
a user interface;
a memory; and
one or more processors coupled to the memory, the user interface, and the wireless transceiver, the one or more processors and the memory configured to:
receive, via the user interface, a first destination;
provide, via the user interface, navigation instructions to the first destination based on first route data;
determine whether the first destination is within a no wireless network coverage area;
responsive to a determination that the first destination is within the no wireless network coverage area, retain the first route data in the memory of the mobile device;
receive, at the mobile device, a second destination;
responsive to a determination that the second destination is not along a route associated with the first route data, provide, via the user interface, navigation instructions based on the first route data to a wireless network coverage area; and
responsive to a determination that the mobile device is within the wireless network coverage area, obtaining second route data to the second destination.

11. The mobile device of claim 10, wherein the obtaining second route data to the second destination comprises:
transmit, via the wireless transceiver, to a server, a request for second route data to the second destination;
receive, via the wireless transceiver, the second route data to the second destination from the server.

12. The mobile device of claim 11, the one or more processors and the memory further configured to:
provide navigation instructions, via the user interface, to the second destination based on the second route data.

13. The mobile device of claim 10, wherein the user interface comprises a display, a speaker, or a combination thereof, and
wherein the one or more processors and the memory configured to provide, via the user interface, navigation instructions to the first destination or to the second destination comprises outputting image-based navigation instructions on the display, outputting text-based navigation instructions on the display, or outputting audio-based navigation instructions via the speaker, or any combination thereof.

14. An apparatus for providing navigation comprising:
means for receiving a first destination;
means for providing navigation instructions to the first destination based on first route data;
means for determining whether the first destination is within a no wireless network coverage area;
means for, responsive to a determination that the first destination is within the no wireless network coverage area, retaining the first route data;
means for receiving, at the mobile device, a second destination;
means for, responsive to a determination that the second destination is not along a route associated with the first route data, providing navigation instructions based on the first route data to a wireless network coverage area; and
means for, responsive to a determination that the mobile device is within the wireless network coverage area, obtaining second route data to the second destination.

15. The apparatus of claim 14,
wherein the means for obtaining second route data to the second destination comprises:
means for transmitting, to a server, a request for second route data to the second destination
means for receiving, from the server, the second route data to the second destination.

16. A non-transitory computer readable medium storing instructions for execution by one or more processors of a mobile device to perform operations comprising:
receiving a first destination;
providing navigation instructions to the first destination based on first route data;
determining whether the first destination is within a no wireless network coverage area;
responsive to a determination that the first destination is within the no wireless network coverage area, retaining the first route data in a memory of the mobile device;
receiving a second destination;
responsive to a determination that the second destination is not along a route associated with the first route data, providing navigation instructions based on the first route data to a wireless network coverage area; and
responsive to a determination that the mobile device is within the wireless network coverage area, obtaining second route data to the second destination.

17. The non-transitory computer readable medium of claim 16, the operations further comprising:
responsive to a determination that the location is within the wireless network coverage area is reached, transmitting, to a server, a request for second route data to the second destination;
receiving, the second route data to the second destination from the server; and
providing navigation instructions, to the second destination based on the second route data.

* * * * *